US012404700B2

(12) United States Patent
Sieglaar et al.

(10) Patent No.: US 12,404,700 B2
(45) Date of Patent: Sep. 2, 2025

(54) LOCK AND METHOD OF ADJUSTING A LOCK CONFIGURATION

(71) Applicant: Schlage Lock Company LLC, Carmel, IN (US)

(72) Inventors: Edward N. Sieglaar, Auckland (NZ); Jeremy Gear, Auckland (NZ)

(73) Assignee: Schlage Lock Company LLC, Carmel, IN (US)

( * ) Notice: Subject to any disclaimer, the term of this patent is extended or adjusted under 35 U.S.C. 154(b) by 763 days.

(21) Appl. No.: 17/126,334

(22) Filed: Dec. 18, 2020

(65) Prior Publication Data

US 2021/0189769 A1 Jun. 24, 2021

(51) Int. Cl.

| | |
|---|---|
| ***E05B 63/00*** | (2006.01) |
| ***E05B 55/00*** | (2006.01) |
| ***E05B 63/08*** | (2006.01) |
| ***E05B 63/16*** | (2006.01) |

(52) U.S. Cl.

CPC .......... *E05B 63/0056* (2013.01); *E05B 55/00* (2013.01); *E05B 63/08* (2013.01); *E05B 63/16* (2013.01)

(58) Field of Classification Search

CPC .. E05B 63/0056; E05B 63/0065; E05B 63/04; E05B 63/08; E05B 63/16; E05B 55/00; E05B 55/005; E05B 17/04; E05B 17/047; E05B 9/04; E05B 9/08; E05B 9/084; E05B 13/004

USPC .......................................................... 70/371

See application file for complete search history.

(56) References Cited

U.S. PATENT DOCUMENTS

| | | | | |
|---|---|---|---|---|
| 2005/0132766 A1* | 6/2005 | Milo | E05B 47/0012 | 70/279.1 |
| 2013/0055775 A1* | 3/2013 | Bartos | E05B 63/0065 | 70/357 |

FOREIGN PATENT DOCUMENTS

| | | | | |
|---|---|---|---|---|
| AU | 2005202969 A1 * | 2/2006 | | |
| DE | 2723887 A * | 12/1978 | E05B 9/084 | |
| EP | 2037062 A2 * | 3/2009 | E05B 63/06 | |
| FR | 2841925 A1 * | 1/2004 | E05B 55/00 | |
| GB | 646388 A * | 11/1950 | | |
| WO | WO-9816706 A1 * | 4/1998 | E05B 13/004 | |
| WO | WO-2004059111 A1 * | 7/2004 | E05B 17/2092 | |
| WO | WO-2006039751 A1 * | 4/2006 | E05B 13/004 | |

* cited by examiner

*Primary Examiner* — Carlos Lugo

(74) *Attorney, Agent, or Firm* — Taft Stettinius & Hollister LLP

(57) ABSTRACT

A lock including a housing having an aperture sized to receive a lock cylinder, and lock componentry positioned within the housing and being adjustable to alter a configuration of the lock, and wherein the lock cylinder is removable from the housing to expose the aperture to provide access to the lock componentry which may be adjusted to set the configuration of the lock. A method is also provided for adjusting a configuration of a lock, including removing a lock cylinder from an aperture in a lock housing to expose the aperture and provide access to lock componentry within the lock housing, adjusting the lock componentry in the lock housing via access provided by the aperture to permit alteration of a configuration of the lock, setting the configuration of the lock via the adjusting of the lock componentry, and reinserting the lock cylinder into the aperture in the lock housing.

26 Claims, 11 Drawing Sheets

Figure 19
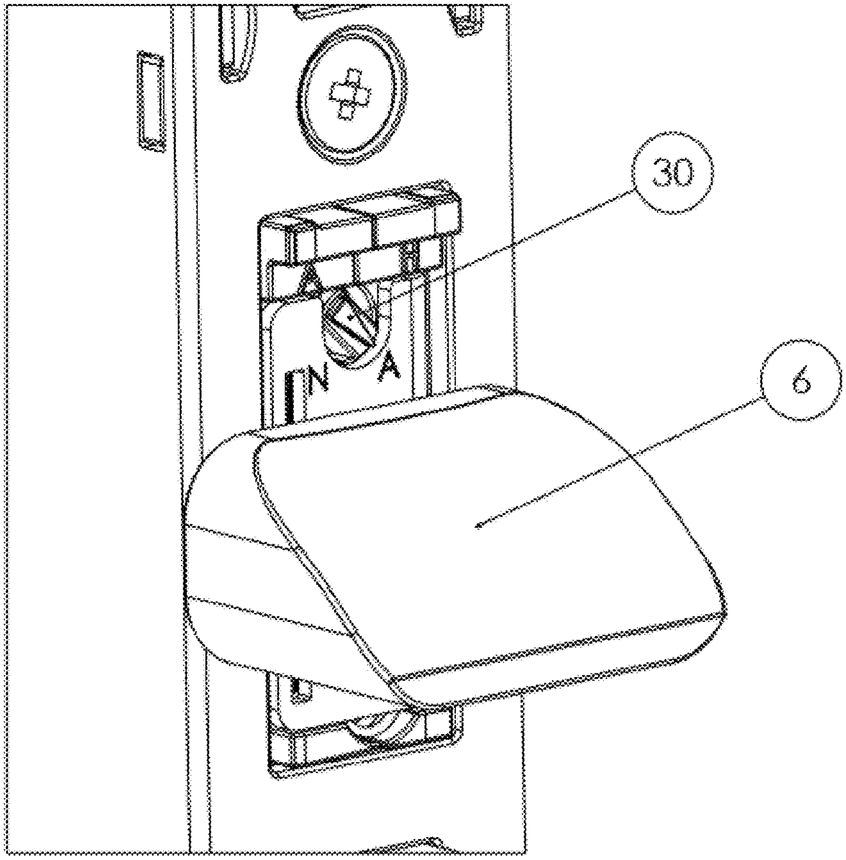
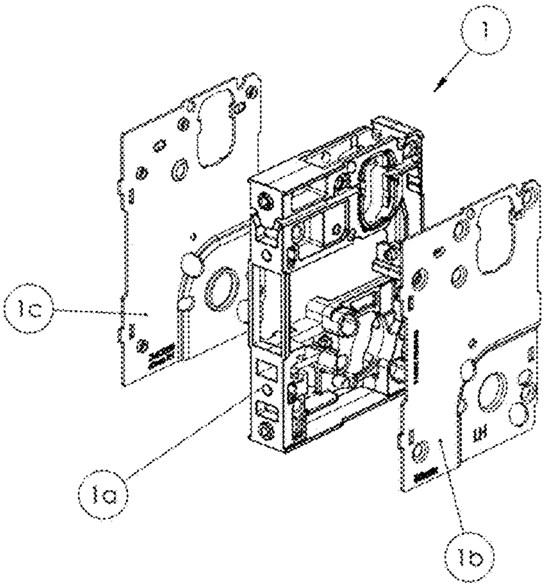
Figure 20a
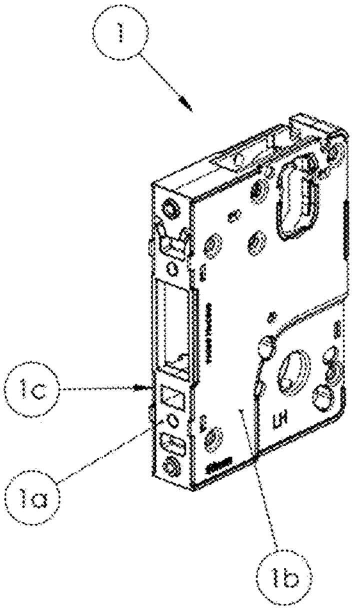
Figure 20b

LOCK AND METHOD OF ADJUSTING A LOCK CONFIGURATION

CROSS REFERENCE TO RELATED APPLICATIONS

This application claims priority to New Zealand Patent Application No. 760348, New Zealand Patent Application No. 760350, and New Zealand Patent Application No. 760353, all filed on Dec. 18, 2019, the contents of each application hereby incorporated by reference in their entirety.

TECHNICAL FIELD

The present disclosure generally relates to locksets, and more particularly but not exclusively relates to mortice locks having an ability to be configured for different end use requirements and/or having a hold-back mode of operation.

BACKGROUND

Locks are used in many and varied ways depending on user requirements. Sometimes locks need to enable unrestricted access from either side of a door, and sometimes from only one side of the door. In some instances, it is desirable for locks to hold-back a latch so that a door can be easily accessed from both sides of the door and without the lock's latch bolt engaged. For example, a retail outlet may at times want its customers to be able to easily push open their main entrance door without having to move a latch bolt out of a keeper on the associated door frame, while still being able to optionally return the lock to a secure state at other times. In other instances, it is desirable for locks to provide an anti-lockout mode. It is also desirable to have a lock that can be easily configured into different settings such as, for example, at least some of those mentioned above. Installing and configuring locks to many different doors as part of a large project can be tedious and time consuming. One object of the present disclosure is to provide a lock that addresses these needs.

It is also known to use mortice locks to regulate the ability of a door to open and close.

Configuring mortice locks for different uses can also be time consuming, particularly when a large number of locks have to be installed and configured. Another object of the present disclosure is to provide a lock that addresses these needs.

It should be understood that the objects of the invention are not limited to the above-referenced needs and objects, and any objects or advantages of any embodiment of the invention should not be taken as a limitation on the claimed invention.

SUMMARY

An exemplary lock includes a housing having an aperture, a lock cylinder configured to be fitted in the aperture of the housing, and lock componentry positioned within the housing which is adjustable to alter a configuration of the lock, and wherein the lock cylinder is removable from the housing to expose the aperture to provide access to the internal componentry such that the internal componentry is adjusted to set the configuration of the lock. Further embodiments, forms, features, and aspects of the present application shall become apparent from the description and figures provided herewith.

According to one aspect of the disclosure, a lock is provided which comprises a housing, a lock cylinder adapted to be substantially snugly fitted in a side aperture of the housing, and componentry within the housing that is adjustable to alter the configuration of the lock, wherein the cylinder can be removed from the housing to expose the aperture to provide access to the componentry such that the componentry is able to be adjusted to set the configuration of the lock.

Optionally, the componentry comprises one or more locking bars that are adjustable to set the configuration of the lock.

Optionally, there are at least two of the locking bars.

Optionally, the componentry comprises a locking bar selector that can be accessed via the aperture and reversibly moved (i.e., slid) to either overlap the locking bars so that, when in use, the locking bars can only move together, or not overlap the locking bars, with the consequence being that the locking bars can move independently of one another.

Optionally, the locking bar selector is arranged to be slid between the overlapping and non-overlapping positions.

Optionally, the locking bar(s) can be set via the aperture to engage with a respective rotating actuator, with the actuator being adapted to be turned as a consequence of a turn of a door handle engaged with the lock.

Optionally, the componentry is hand adjustable by way of a tool that is substantially in the shape of a hockey stick, to set the configuration of the lock.

Optionally, the componentry comprises a spindle that is adjustable to set the configuration of the lock.

Optionally, the spindle can be adjustably turned through a selection of stop positions where, for at least some different stop positions, the spindle causes the lock to be configured differently.

Optionally, at least some of the stop positions are separated by a 90° turn of the spindle.

Optionally, at least some of the stop positions are separated by a 120° turn of the spindle.

Optionally, the spindle has a hold-back recess that, in at least one of the stop positions, enables a hold-back component (e.g., a spring loaded locking plate) to advance into the recess and engage with a recess in the housing so that a bolt forming part of the latch is held inside the housing.

Optionally, the hold-back component is only able to advance into the spindle's recess at one of the stop positions.

Optionally, the spindle has a plurality of radial teeth that can be accessed through the aperture and pushed or pulled with hand force (e.g., using a tool) to rotationally adjust the spindle.

Optionally, the lock cylinder is such that, when installed, can be turned with a key.

Optionally, the cylinder has a turn adaptor that can be finger-gripped and turned to cause the cylinder, when installed, to turn.

According to another aspect of the disclosure, a lock is provided which comprises latch means that can be moved between a forward position and a retracted position, a pair of actuators, a pair of locking bars, and moving means, wherein the lock is configured such that each actuator can turn to cause the latch means to move between its forward and retracted positions, and the moving means can, in at least one setting of the lock, cause movement of one of the locking bars independent of the other locking bar to engage a respective one of the actuators to prevent that actuator from moving the latch means between the forward and retracted positions.

Optionally, the actuators are side by side.

Optionally, the moving means is adapted to move the locking bars between raised and lowered positions.

Optionally, the moving means comprises a key cylinder arranged so that the key cylinder can, in the at least one setting of the lock, move just one of the locking bars.

Optionally, each actuator comprises a hub and an outwardly extending arm, with each arm arranged for movement of the latch means.

Optionally, the latch means comprises a lock bolt able to move between bolt-extended and bolt-retracted positions.

Optionally, at least one of the actuators comprises a recess that can be engaged by a respective one of the locking bars to prevent movement of the actuator.

Optionally, a foot of the engaging locking bar is adapted to engage the recess.

Optionally, the latch mechanism is spring biased towards its forward position.

Optionally, the lock has a selector that can be set so that the locking bars move in unison, and can be re-set so that one locking bar can move independently of the other locking bar to engage a respective one of the actuators with said other locking bar not engaging any of the actuators.

Optionally, the selector can be slid to align with one of the locking bars and can be subsequently slid to overlap the locking bars.

Optionally, the lock can be functioned by non-destructively removing a key cylinder, or the key cylinder as the case may be, and manipulating the selector through an opening left by removal of the cylinder.

Optionally, at least one of the locking bars has a spring biased detent adapted to hold that locking bar clear of the actuators.

Optionally, the latch means has a bolt arranged for engagement with a strike plate of a doorway, each actuator has a central hub and an outwardly extending arm with each arm arranged for engagement with the latch mechanism, each actuator engages a handle activated snib, at least one of the actuators has a notch for receiving a foot of one of the locking bars to prevent the actuator on the one setting of the lock from turning, a selector that can be slid to overlap the locking bars so that they are set to move in unison, a key cylinder that can when turned by a key move at least one of the locking bars into engagement with one of the actuators, and/or the selector can be accessed via an opening left upon removal of the lock cylinder.

According to a further aspect of the disclosure, a method of adjusting a configuration of a lock is provided, including removing a lock cylinder from an aperture in a lock housing to expose the aperture and provide access to lock componentry positioned within the lock housing, adjusting the lock componentry in the lock housing via access provided by the aperture to permit alteration of a configuration of the lock, setting the configuration of the lock via the adjusting of the lock componentry, and reinserting the lock cylinder into the aperture in the lock housing.

Optionally, the lock componentry comprises at least two locking bars, and the adjusting comprises adjusting the locking bars to set the configuration of the lock.

Optionally, the lock componentry comprises a locking bar selector that is accessible via the aperture of the housing, the method further comprising reversibly moving the bar selector to either overlap the locking bars wherein the locking bars can only move together, or not overlap the locking bars wherein the locking bars are able to move independently of one another.

Optionally, the at least two locking bars are set via the aperture in the lock housing to engage with a respective rotating actuator, and the rotating actuator is turned as a result of a turn of a door handle engaged with the lock.

Optionally, the lock componentry comprises a spindle that is adjustable to set the configuration of the lock.

Optionally, the spindle is configured to be adjustably turned through a selection of different stop positions wherein, for at least some of the stop positions, the spindle causes the lock to be configured differently.

According to another aspect of the disclosure, a lock is provided which comprises a housing, a latch that has a latch bolt and a hold-back component, and wherein the hold-back component can be moved to a hold-back position where it engages a portion of the housing to maintain the latch bolt substantially within the housing.

Optionally, movement of the hold-back component is such that it engages an internal portion of the housing.

Optionally, the latch incorporates a spindle having a recess, and the lock is formed so that the hold-back position is achieved when the spindle is turned to a position where the hold-back component is able to reversibly advance into the spindle recess under constant spring tension to engage the housing.

Optionally, the lock is formed so that when the latch bolt is substantially within the housing, the hold-back component is engaged within a recess in the housing.

Optionally, the hold-back component comprises one or more legs that is engaged within the recess in the housing when the latch bolt is substantially within the housing.

Optionally, the hold-back component has two legs arranged to straddle the spindle recess when the hold-back component is received in the spindle recess.

Optionally, the hold-back component comprises a plate.

Optionally, the latch comprises a selector arranged such that a) the selector is adapted to slide along the spindle, b) the selector is spring biased away from the hold-back component, c) the selector blocks the hold-back component from assuming the hold-back position until moved against the spring bias to provide space for the hold-back component to advance into the spindle recess, and d) the selector can be moved into and out of its hold-back blocking position by turning a lock cylinder so that a cam of the cylinder engages and moves the selector.

Optionally, the selector is arranged so that when the latch-bolt is held substantially within the housing, the hold-back component is simultaneously engaged with the spindle recess and a hold-back recess of the selector.

Optionally, the selector has a protrusion that can be slid into engagement with the hold-back component to disengage the hold-back component from the spindle recess.

BRIEF DESCRIPTION OF THE FIGURES

FIG. 19 illustrates a visual indicator to show the current configuration of the lock.

FIGS. 20*a*-20*b* illustrate a housing forming part of the lock, prior to assembly and when assembled, respectively.

DETAILED DESCRIPTION OF ILLUSTRATIVE EMBODIMENTS

Figure 1:
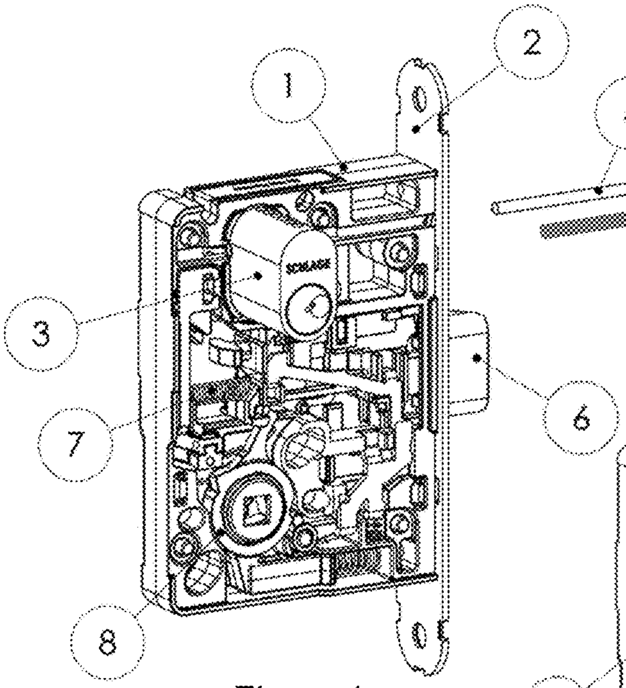
FIG. 1 is an isometric view of a lock for use in a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIGS. 1 and 2, the X-axis defines first and second longitudinal directions, the Y-axis defines first and second lateral directions, and the Z-axis defines first and second transverse directions. More particularly, the longitudinal X-axis defines a proximal direction $X^+$ (to the left in FIG. 1) and an opposite distal direction $X^-$ (to the right in FIG. 1), the lateral Y-axis defines a laterally inward direction $Y^+$ (upward in FIG. 1) and an opposite laterally outward direction $Y^-$ (downward in FIG. 1). Additionally, the Z-axis defines a first transverse direction $Z^+$ (upward in FIG. 2) and a second transverse direction $Z^-$ (downward in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

Referring to FIG. 1, a mortice lock for a door has a housing 1 incorporating a front plate 2. A key cylinder 3 is fitted to the side of the housing to facilitate locking and unlocking as desired.

Figure 2:
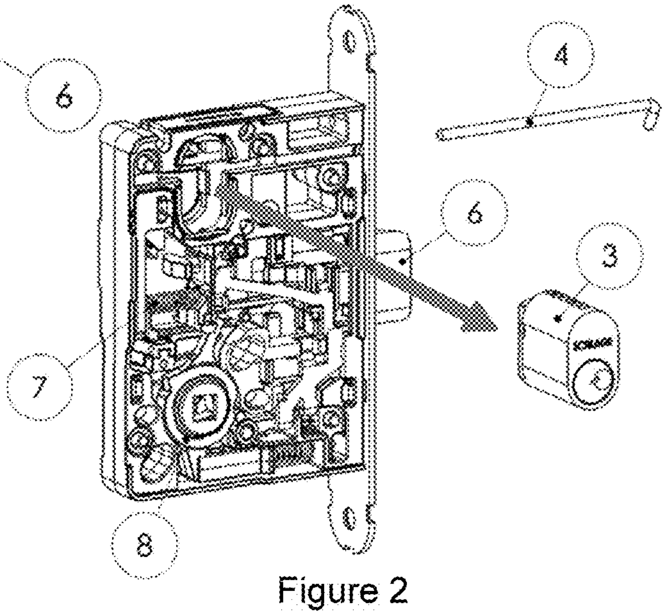
FIG. 2 is an isometric view of the lock with its key cylinder removed.
Figure 3:
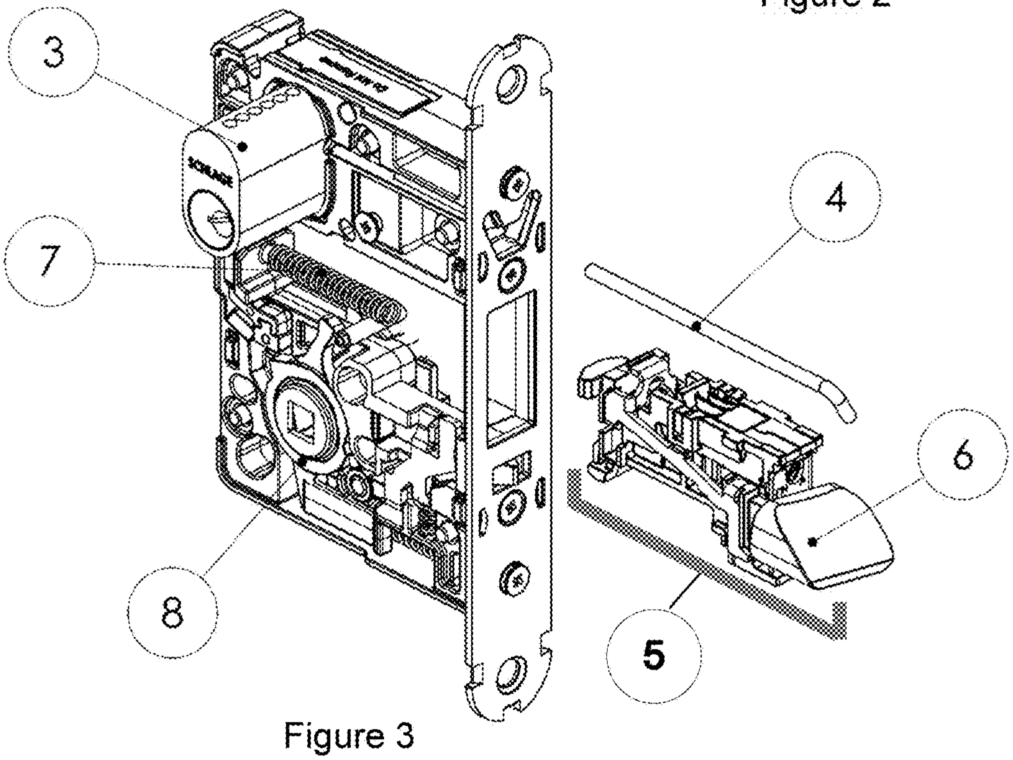
FIG. 3 is an isometric view of the lock with its latch mechanism removed.

Referring to FIGS. 1, 2 and 3, the cylinder 3 is held in place by way of a tool 4 that removably passes through an aperture of the cylinder. The tool 4 is in the shape of a hockey stick and can be slid into and out of engagement with the cylinder 3 from the front plate 2.

As shown in FIG. 3, the lock incorporates a latch mechanism 5 fitted into the housing so that its bolt 6 can move forwards and backwards depending on how the lock is manipulated. A spring 7 biases the bolt 6 to a locking position where it extends outside the housing for engaging the strike plate of a door frame (not shown). However, the biasing force can be overcome to draw the bolt 6 into the housing 1 so that the door can be opened.

Two Actuators

Figure 4:
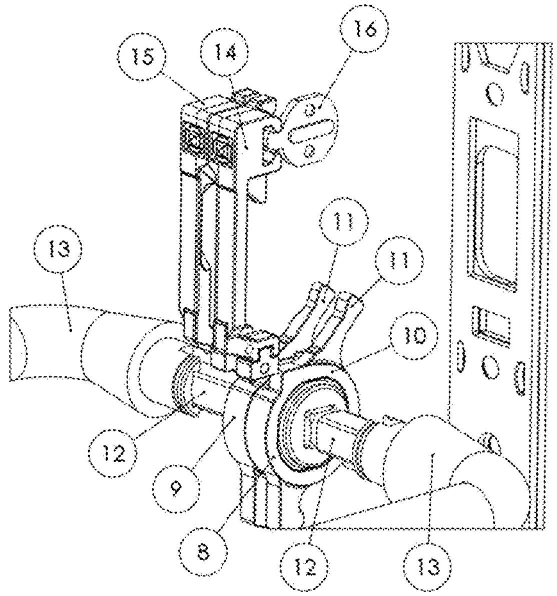
FIG. 4 illustrates details of a handle, an actuator and a locking bar of the lock.

Referring to FIGS. 1-4, and especially FIG. 4, the lock has a pair of actuators 8, 9 arranged side by side. Each actuator

8, 9 has a central hub 10 and an upwardly angled arm 11. In other embodiments, there may be more than two such actuators.

Figure 5:
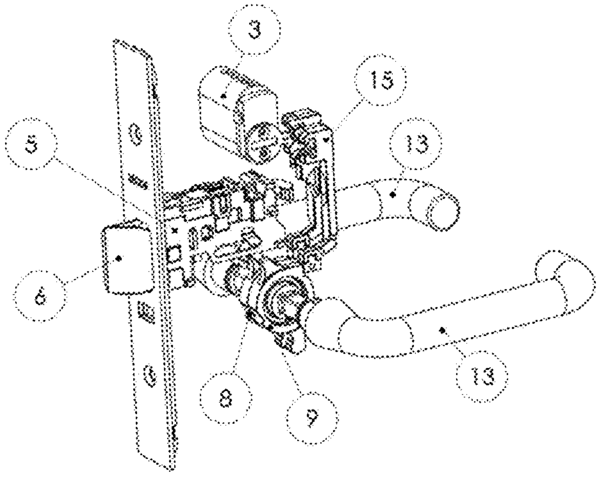
FIG. 5 illustrates further details of the handle, the actuator and the locking bar parts.

With further reference to FIG. 4, in combination with FIG. 5, each actuator 8, 9 receives a separate handle spindle 12, which is in turn associated with a respective handle 13 on either side of the door, so that turning of one or other of the handles drives the associated spindle to rotate one or other of the actuators 8, 9. In alternative embodiments, the actuators 8, 9 may work with a common spindle (i.e., one spindle for both as opposed to each having a separate spindle).

Figure 6:
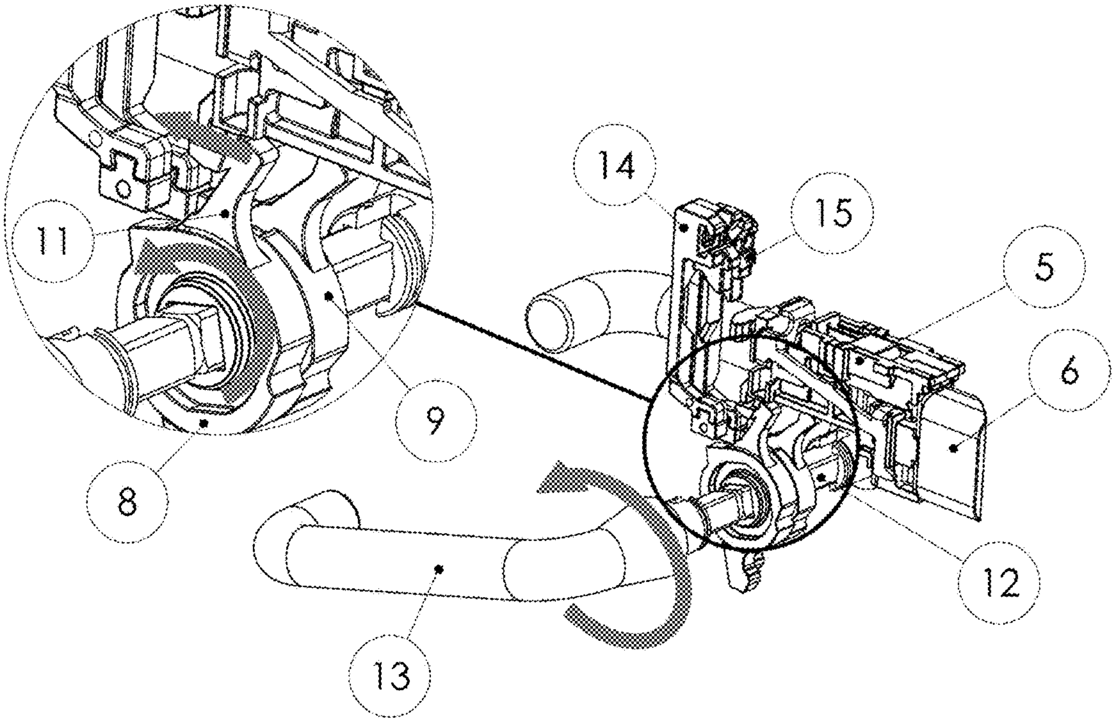
FIG. 6 illustrates still further details of the handle, the actuator and the locking bar parts.

Referring to FIG. 6, as the actuators 8, 9 rotate one way or the other (i.e., when the handles 13 are turned), the angled arm 11 in each case swings to move the latch mechanism 5 so that the bolt 6 moves forwards or backwards, depending on the direction of rotation.

Referring to FIGS. 4, 5 and 6, the lock incorporates a pair of locking bars 14, 15.

However, in other embodiments, there may be more than two such locking bars 14, 15. The locking bars 14, 15 are driven up or down by way of a cam 16 (see FIG. 4) forming part of the key cylinder 3. In other words, the locking bars can be moved up and down via a hand-turned key when inserted in the cylinder 3. For clarity and ease of illustration, FIG. 4 shows the cam 16 without the rest of the cylinder. However, the cylinder 3 is shown in full in FIG. 5.

Figure 7:
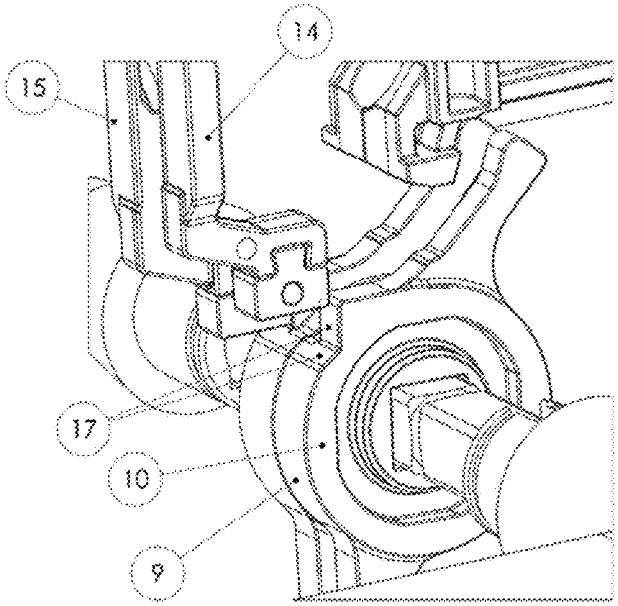
FIG. 7 illustrates the manner of engagement between the actuator and the locking bar parts.

Referring to FIG. 7, the central hub of each actuator 8, 9 has a notch 17 for receiving a foot of a respective one of the locking bars 14, 15. When the foot of the locking bar is located in the respective notch 17, the associated actuator is unable to rotate to move the bolt 6, and the door is therefore locked to one side.

Figure 8A:
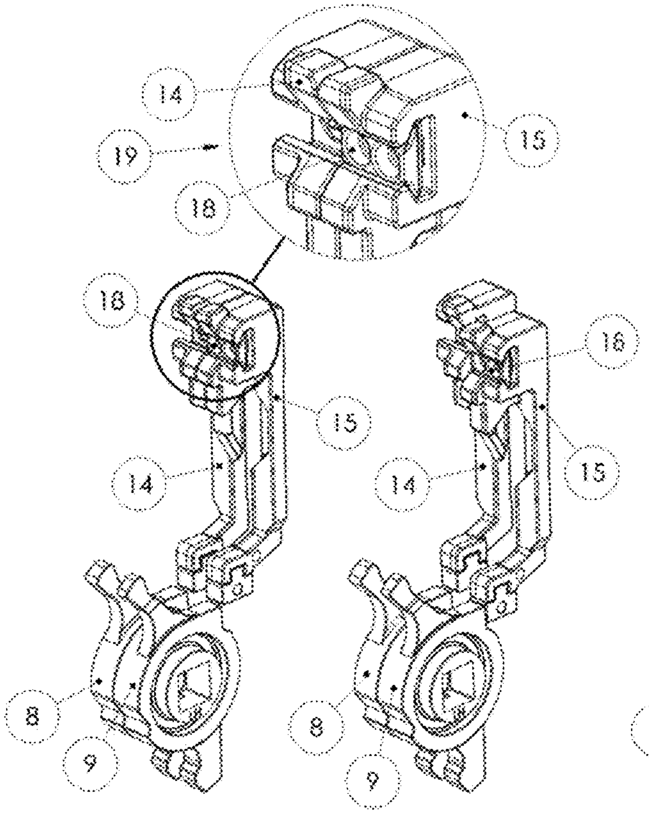
FIGS. 8*a* and 8*b* further illustrates the manner of engagement between the actuator and the locking bar parts.
Figure 8B:
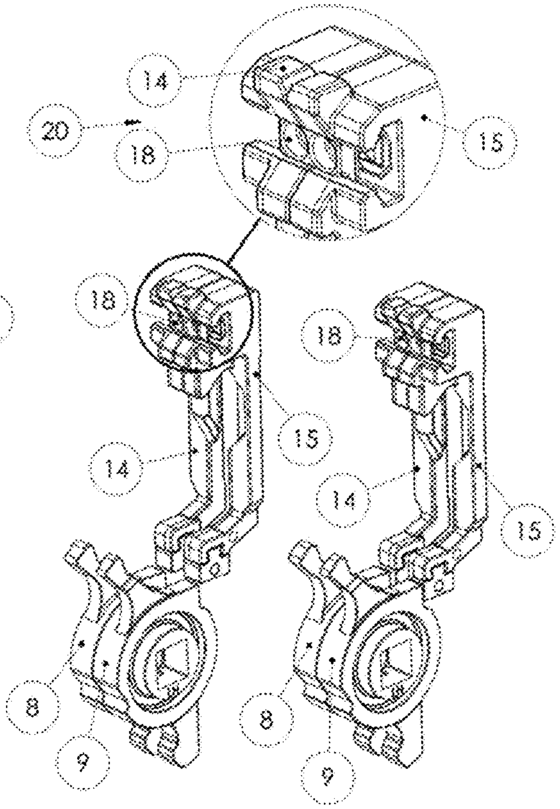

FIGS. 8*a*-8*b* illustrate the manner in which the locking bars 14, 15 can be set to move independently or in unison. This is achieved by way of a sliding selector 18 that can be located at only one or other of the locking bars, as shown at 19, to provide freedom to move independently. However, the selector 18 can also be set to overlap the locking bars, as shown at 20, such that the locking bars can only move in unison. The lock can therefore be configured to suit end user needs by moving the selector 18 into the desired position. This can be done when the lock is first installed, prior to installation, or subsequently at any point after installation.

Figure 9:
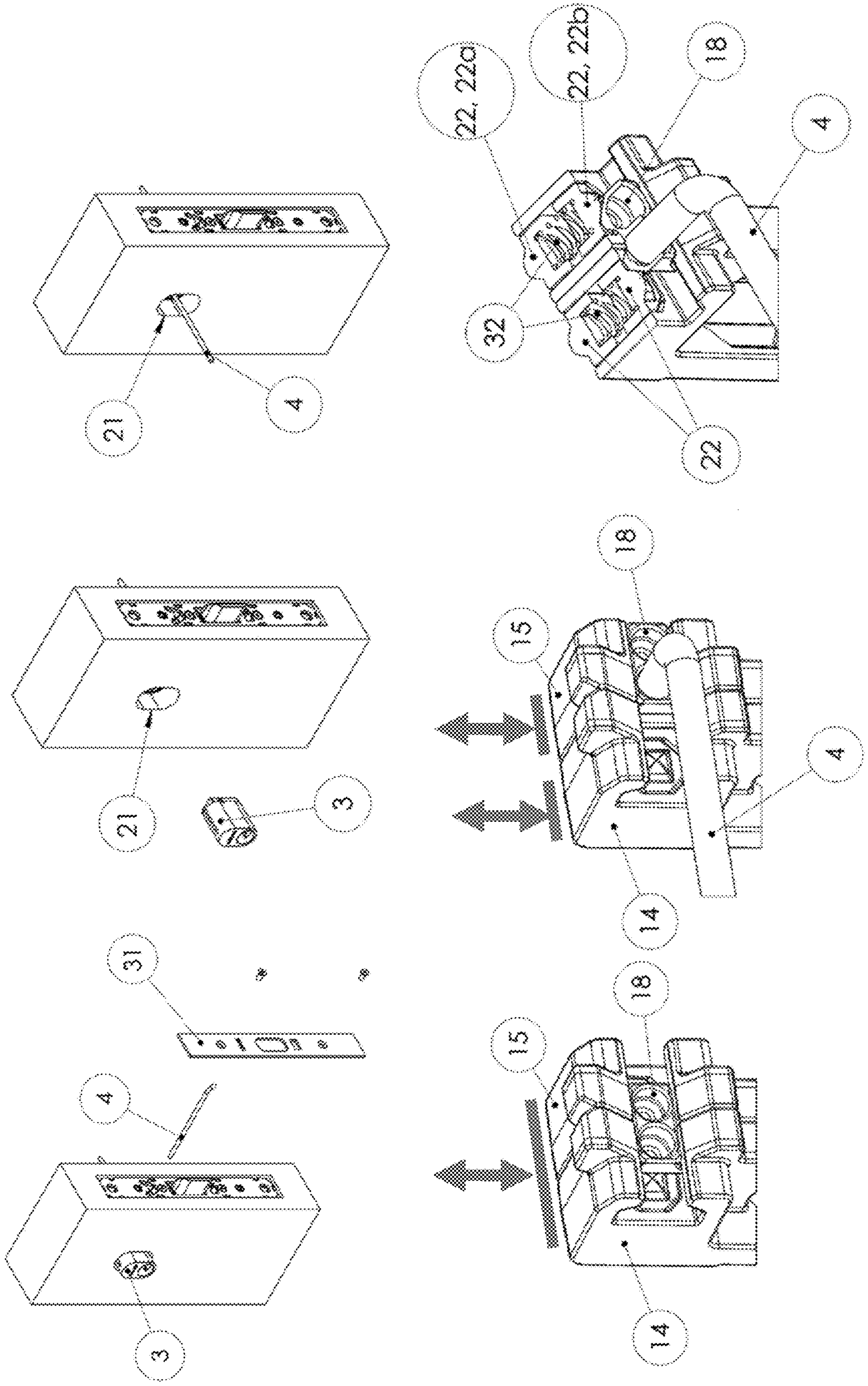
FIG. 9 illustrates the manner in which the locking bars can be selected to obtain different variations of functionality of the lock.

As shown in FIG. 9, the position of the selector 18 can be set by removing the cylinder 3 to expose an opening 21 in the housing 1. The tool 4 associated with the cylinder 3 can then be inserted into the opening 21 and used to push or pull the sliding selector 18 into the desired position.

As there are two actuators 8, 9 and two locking bars 14, 15, each actuator can be locked against rotation independently. This means that the lock may be set so the door is locked or can otherwise be opened from one side but not the other. However, the lock can also be set so that the locking bars cannot move independently. In that case, the door can be locked or unlocked or otherwise opened from both sides.

It is advantageous that the lock can be ‘functioned’ by accessing the mechanism through the opening 21 in the housing that receives the cylinder 3. Accordingly, configuration of the lock can be achieved without having to remove the lock from the door. Additionally, there is no need to provide a tamper-vulnerable access point into the lock from a front location of the housing.

Referring further to FIG. 9, the top of each locking bar 14, 15 is associated with a pair of detents 22. The pair of detents 22*a*, 22*b* are spring biased away from one another. This is achieved by a spring 32 located between each pair of detents. Therefore, one detent of each pair is spring-biased forwards and the other is spring-biased backwards. The backwards biased detents 22*a* can locate in a recess (not shown) of the housing to hold the locking bars 14, 15 up and off of the respective actuators 8, 9. However, the spring force on the detents can be easily overcome to free the locking bars for movement up and down, for example, via a key turn at the cylinder 3. The detents provide a way of keeping a non-active one of the locking bars 14, 15 away from its respective actuator 8, 9 when the lock is functioned so that only one of the locking bars is active, or in other words is able to be moved by a key turn.

Hold-Back & Anti-Lockout Modes

Figure 10:
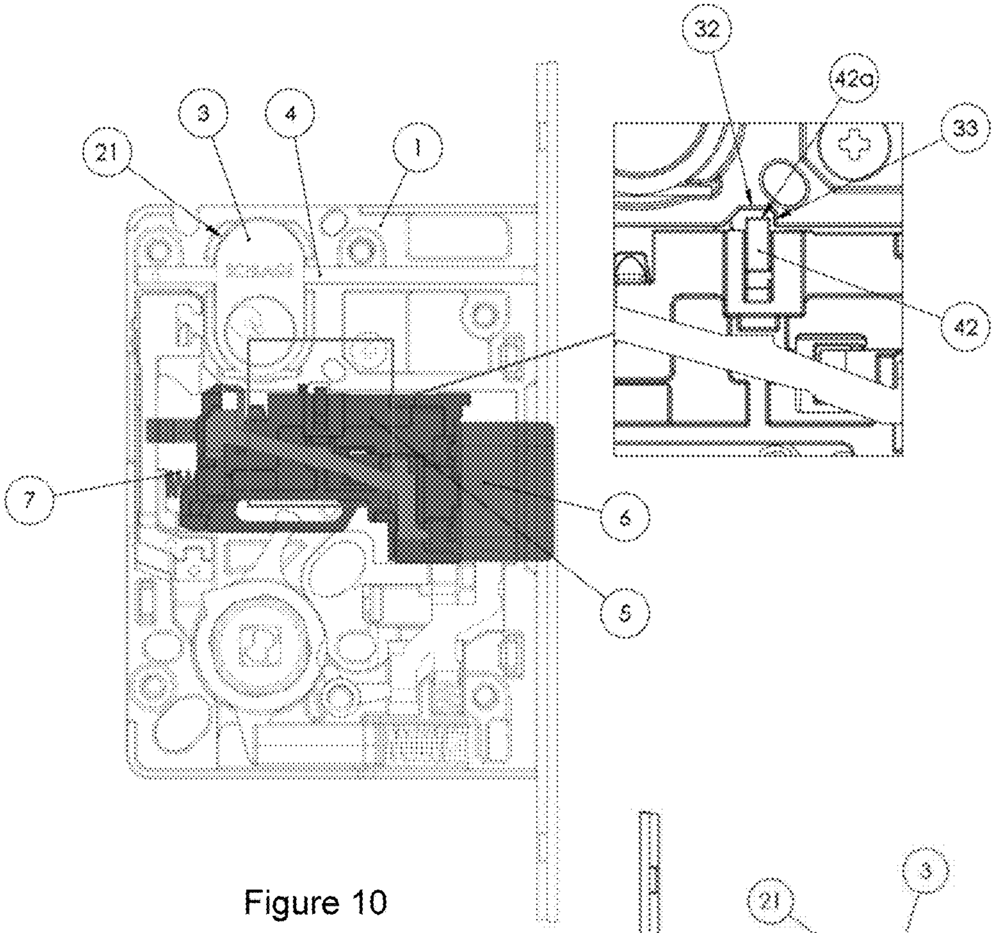
FIG. 10 is a side view of the lock when its bolt is in a hold-back position.

Referring to FIG. 10, it is sometimes desirable to be able to “hold-back” the latch mechanism 5 so that the bolt 6 remains inside the housing 1 and contrary to tension from the spring 7. Otherwise, the spring 7 would urge the bolt 6 into its forward (out of housing) door locking position. This is known as the hold-back mode of the lock. The hold-back mode is achieved by reversibly moving a hold-back, in this case a hold-back plate 42, into a normal path of movement of the latch mechanism 5. As shown, the hold-back plate 42 protrudes into a recess 32 in the housing 1 to prevent the spring 7 from pushing the latch mechanism, and therefore the bolt, into a door locking position. The details of this relationship will become more apparent from the description below.

Figure 11:
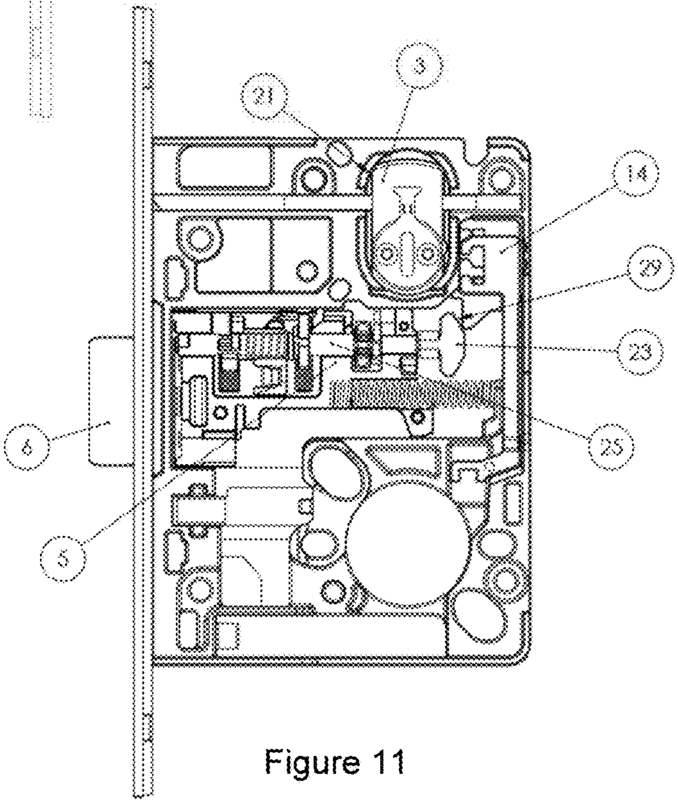
FIG. 11 is side view of the lock illustrating operation of an anti-lockout mode of the lock.

Referring to FIG. 11, the lock can also be arranged with a latch spindle 25 in a position where a lobed head 23 having a ramped portion 29 is able to interact with one or both of the locking bars 14, 15 when the latch 5 is retracted by either a turn of the handle 13 or a key turn of the cylinder 3. When the lobed head is in this state, the lock is said to be in an anti-lockout mode. In the anti-lockout mode, the bolt 6 extends outside the main housing 1 but can be freely retracted to enable access through the doorway/door with which the lock is used. The intent of the anti-lockout mode is to ensure that a person is unable to lock themselves out unintentionally when passing through a door (i.e., for example, without a key).

Adjusting the Spindle for Different Modes

Figure 12:
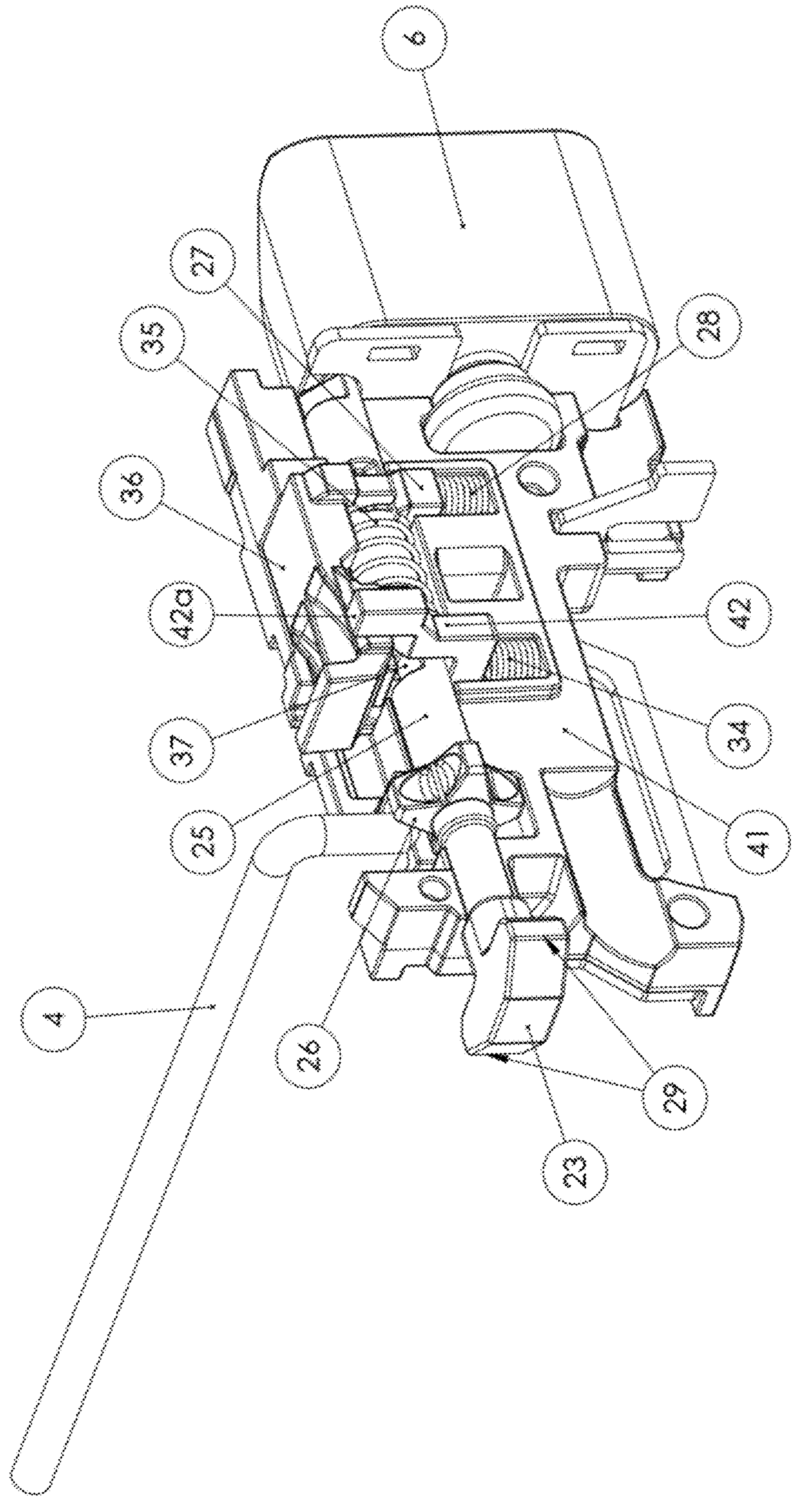
FIG. 12 is an isometric view of the latch mechanism illustrating internal componentry involved in selection of the state of the lock.

Referring to FIG. 12, the latch spindle 25 can turn within a spindle housing 41. For ease of illustration and description, only part of the housing 41 is shown. The latch spindle 25 can be adjustably rotated to four stop positions (i.e., spaced at 90° intervals) to alter the orientation of the lobed head 23. Adjustment in this manner can be achieved on installation of the lock, or later by inserting the hockey stick shaped tool 4 through the cylinder opening 21 (as shown in FIG. 11). The cylinder opening 21 is accessed by removal of the face plate 31, the hockey stick shaped tool 4 and the cylinder 3 (see, e.g., FIG. 9). The hockey stick shaped tool 4 is used to push or pull on radial adjuster teeth 26 of the spindle. Further, the spindle 25 has a hold-back recess 37 for receiving the hold-back plate 42 illustrated in FIG. 10.

Figure 13A:
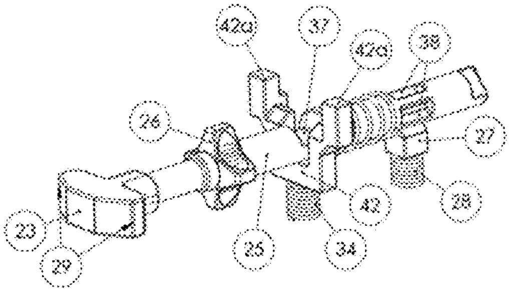
FIGS. 13*a*-13*c* illustrate the position of latch mechanism components in neutral, anti-lockout and hold-back lock states.
Figure 13B:
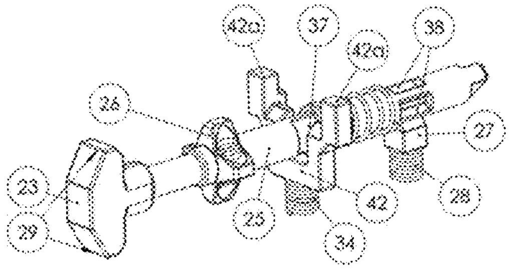
Figure 13C:
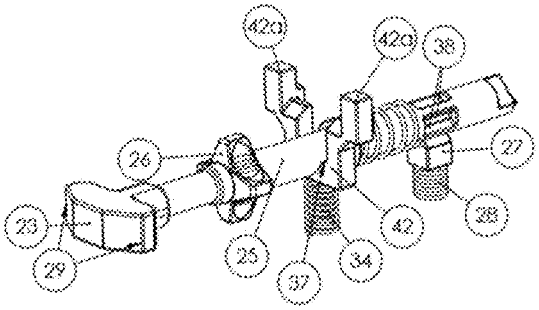

FIGS. 13*a-c* illustrate further details associated with the latch mechanism 5, and in particular three of the 90° adjustment positions. Regarding FIG. 13*a*, the lock is set in its neutral mode where the recess faces upwards. Regarding FIG. 13*b*, the lock is in its anti-lockout mode where the recess 37 faces sideways, and the ramped portion 29 of the spindle’s lobed head faces upwards so as to be able to interact with locking bar(s). Regarding FIG. 13*c*, the lock is set in its hold-back mode where the recess 37 faces down. The fourth 90° rotational stop position is not shown, but also amounts to an anti-lockout mode. It can be considered a mirror image of the FIG. 13*b* position, but where the recess 37 faces in an opposite sideways direction.

The four 90° rotational stop positions are reached and maintained when one of four apertures 38 in the spindle are aligned with a locating detent 27. The detent 27 is under a constant upward force from a spring 28 such that when it engages a corresponding aperture 38, the spindle is positively retained in the neutral, anti-lockout and hold-back position, respectively. However, a deliberate, positive rotational force applied to the spindle 25 frees the detent 27 from the aperture within which it is located.

In FIG. 13*a-b*, the hold-back plate 42 is abutted against the bottom of the spindle 25. The plate 42 is urged upwardly by a constant force provided by a spring 34. However, the plate 42 is not able to enter the recess 37 to hold-back the latch mechanism because the recess 37 is not located or orientated to receive it. By contrast, in FIG. 13*c*, which corresponds to the hold-back mode, the spindle recess 37 is orientated downwardly to face the plate 42. This allows the plate 42 to advance up into the spindle recess 37, under force from the spring 34, to hold-back the latch mechanism 5. As a consequence, the bolt 6 is held back within the housing 1. In this position, upper legs 42*a* at either side of the hold-back plate 42 are caught against the front edge 33 of the recess 32 in the housing 1 (see FIGS. 10 and 13*a-c*).

Once the lock has been set in its general hold-back mode, it is desirable, in everyday use, for that mode to be selectively activated and deactivated by a human user. In other words, the lock can be placed in its hold-back mode for easy 'push-open access' during certain times of the day, and subsequently placed in a lockable security state for other times of the day. FIGS. 14*a*, 14*b*, 14*c*, 15, 16, 17*a*, 17*b* and 17*c* illustrate the method by which this is achieved.

Figure 14A:
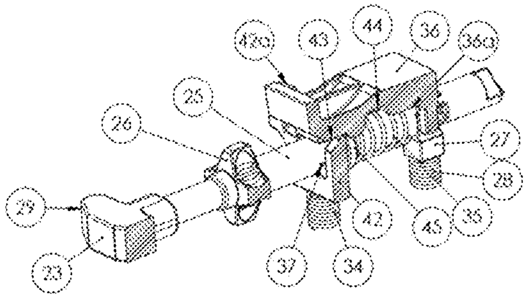
FIGS. 14*a*-14*d* illustrate engagement and disengagement of a hold-back plate.

Referring to FIG. 14*a*, the spindle 25 is set in the hold-back state with its recess 37 facing downwardly and engaged with the plate 42. The leg 42*a* of the plate 42 that would otherwise be in the foreground of the drawing is omitted for ease of explanation and illustration. However, the leg 42*a* behind the spindle is illustrated. A selector 36 is located within the housing 41 and is subject to constant biasing force from a spring 35. The spring 35 is seated on an annular retaining step 45 of the spindle 25 and serves to bias the selector in a direction away from the plate 42. The selector 36 is constrained at a resting position at the other side of the spring 35 by a stop (not shown) which forms part of the housing 41. When the selector 36 is in the resting state, the spring 35 is partially compressed so that there is some constant force on it.

Figure 14B:
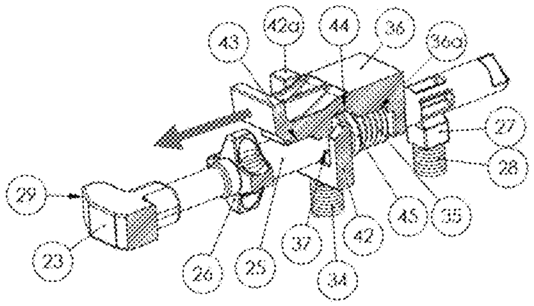
Figure 14C:
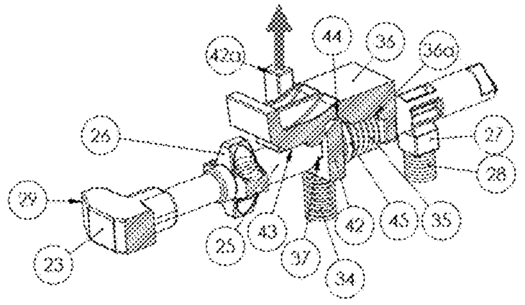

In FIG. 14*a*, a lower step 43 of the selector 36 prevents upward advancement of the plate 42 into the spindle recess 37. However, as shown in FIG. 14*b*, when a sufficient deliberate force is applied to the selector 36 to move the selector 36 along the spindle to the left, the selector's step 43 moves past the plate 42. This movement exposes the plate 42 to a larger recess 44 on the underside of the selector so that the plate 42, under force from the spring 34, is able to move up into the spindle's recess 37. Additionally, FIG. 14*c* shows the plate 42 when it has located itself in this way, as far as it can travel into the selector recess 44. This fully advanced position of the plate 42 corresponds with the state shown in FIG. 13*c*. In this position, the legs 42*a* of the plate (only one of which is shown in FIG. 14*c*) are located in the recess 32 of the main housing (see FIG. 10) to hold-back the bolt 6. Once again, in this disposition, the lock is in a hold-back mode.

Figure 14D:
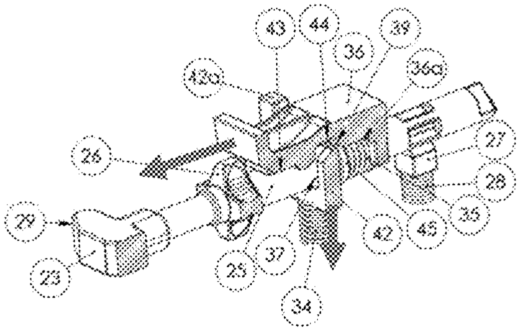

FIG. 14*d* illustrates how still further movement of the selector 36 along the spindle (i.e., to the left) causes a ramp 39 of the selector 36 to interact with the hold-back plate 42. This interaction drives the plate 42 back down to the retracted positon of FIG. 14*a*. FIG. 14*d* only shows the initial stages of this movement, but when it is complete, the plate 42 is held below the spindle recess 37 by a step 36*a* of the selector.

Figure 15:
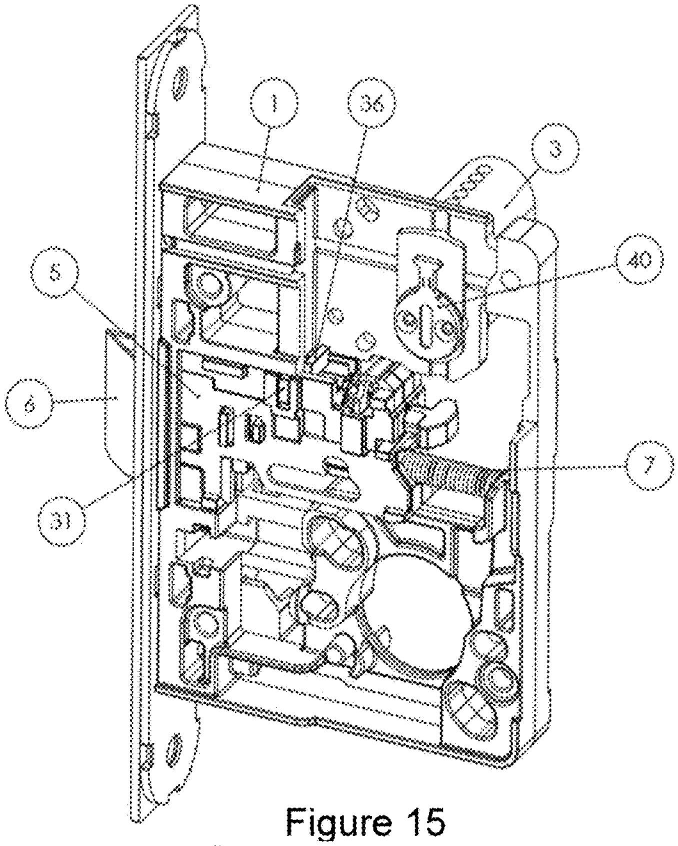
FIG. 15 is an isometric view of some parts of the lock prior to being placed in a hold-back mode.
Figure 16:
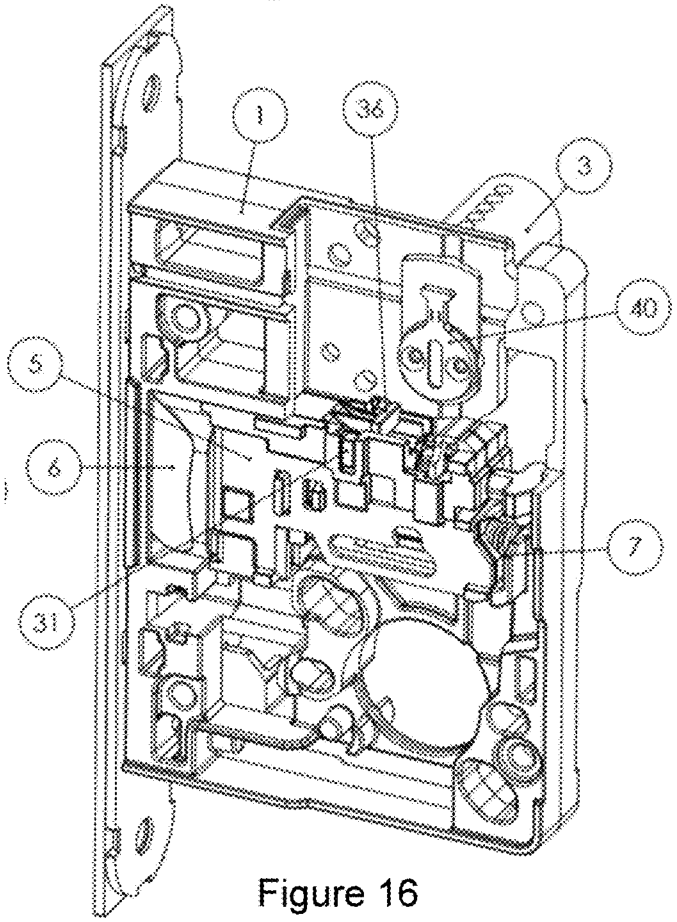
FIG. 16 is an isometric view similar to FIG. 15, but with the latch mechanism fully retracted.
Figure 17A:
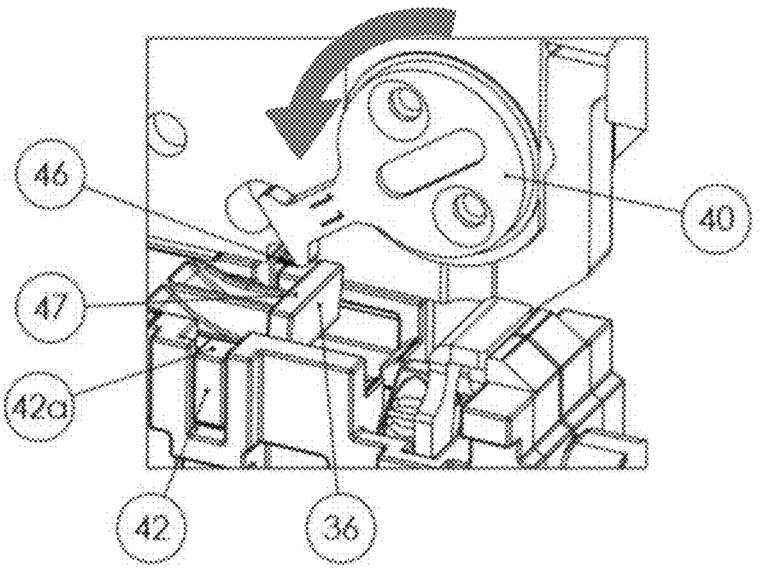
FIGS. 17*a*-17*c* illustrate details relevant to engagement of the hold-back mode.
Figure 17B:
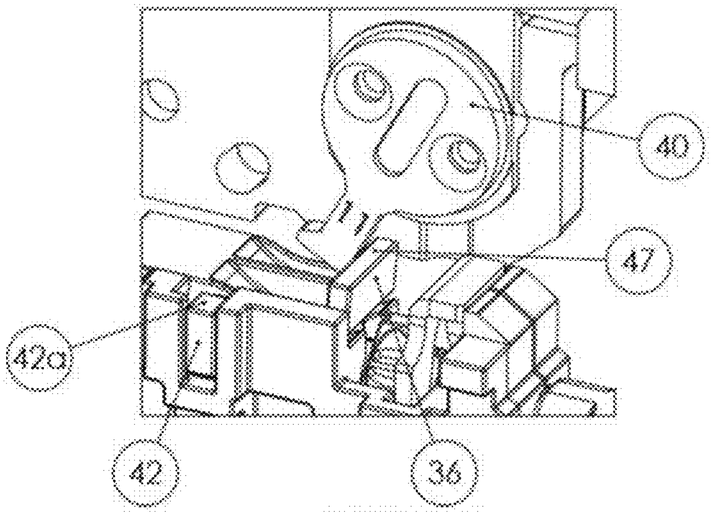
Figure 17C:
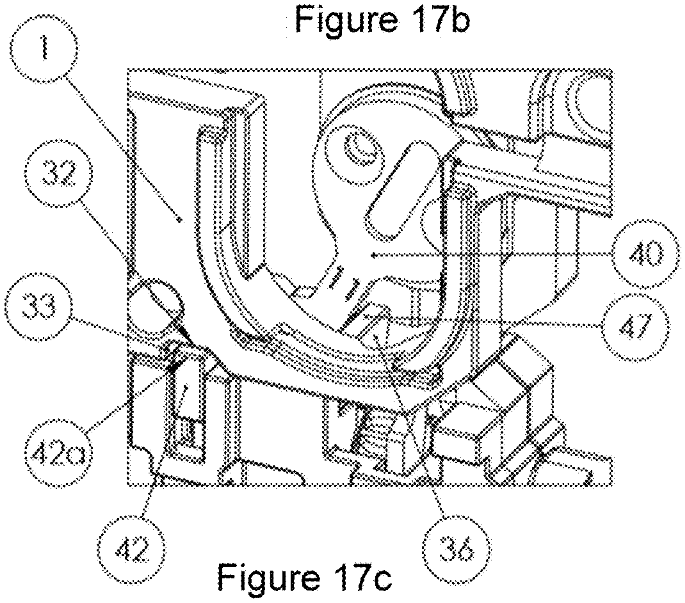

FIGS. 15, 16 and 17*a-c* further illustrate how the hold-back mode may be achieved (some components are omitted from the drawings for ease of illustration). Referring firstly to FIGS. 15 and 16, a door (not shown) is fitted with the lock opened. A human user then presses the latch 5 by hand and fully positioned in the main housing 1. While holding the latch 5 inside the lock, the user proceeds to turn the lock's key (or a turn adaptor) in its cylinder 3 to rotate a latch retraction cam 40. This movement is indicated in FIG. 17*a* and, as shown, a leading edge 46 of the cam 40 pushes against an upstand 47 of the selector 36. As the cam 40 continues to rotate along this path, the cam 40 moves the selector 36 along the spindle to the positions indicated in FIGS. 14*b* and 14*c*. This in turn enables the hold-back 36 to advance into the recess 32 to hold the latch 5 back in the main housing 1 (see FIG. 10). At this point the user can release hand force on the latch 5 and remove the key from the lock. The lock is thereby maintained in its hold-back mode, as shown in FIG. 17*c*.

Figure 18A:
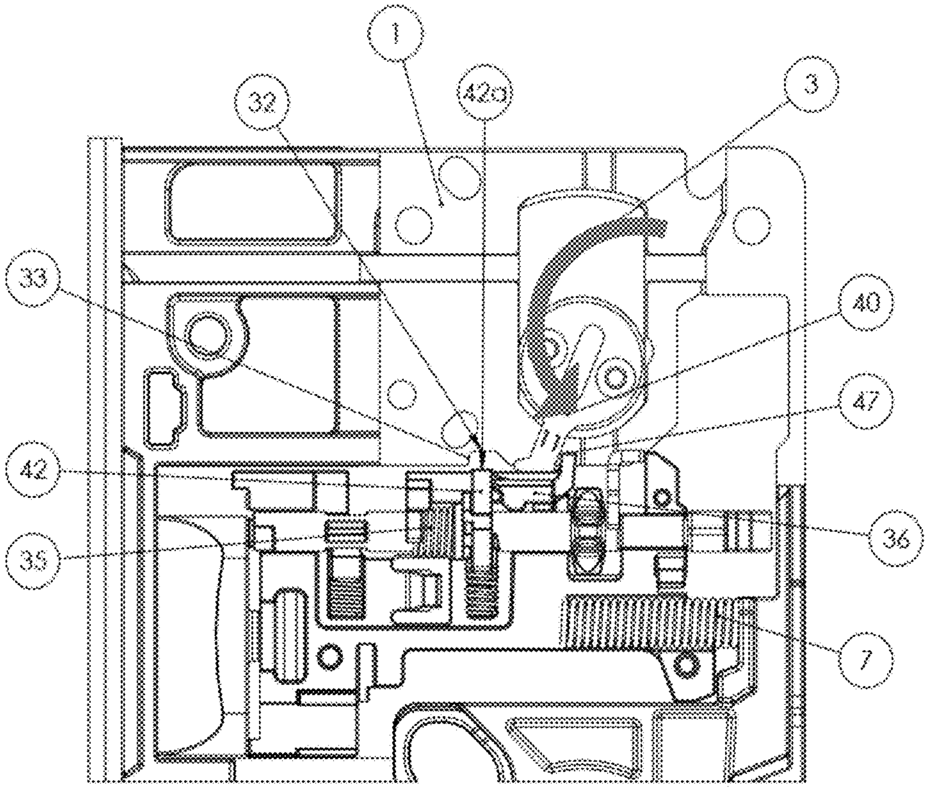
FIGS. 18*a*-18*b* illustrate disengagement of the hold-back mode.
Figure 18B:
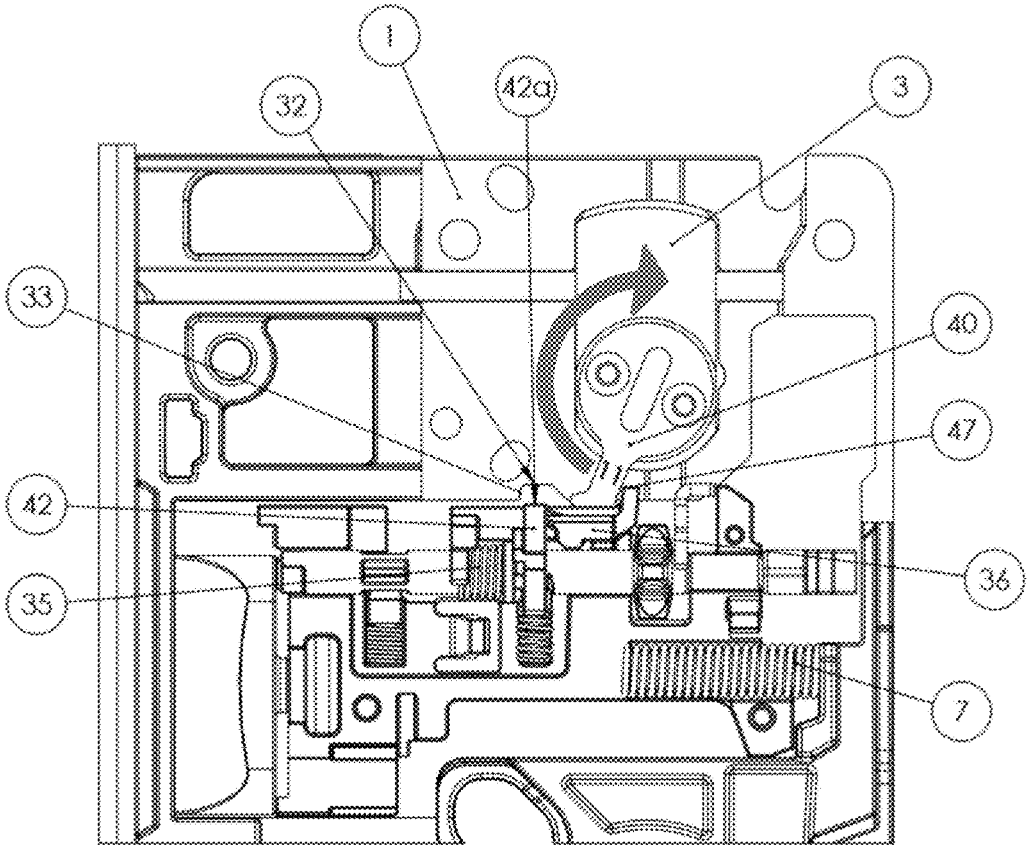

FIGS. 18*a-b* illustrate how a human user can disengage the hold-back mode. Referring to FIG. 18*a*, the user turns the key in the cylinder 3 (or a turn adaptor) to rotate the cam 40 to push the selector upstand 47. The user continues this movement so that the cam 40 moves the hold-back 36 to the position illustrated in FIG. 14*d*. When in that position, the hold-back plate 42 is driven back down to its retracted position and disengages the recess 32 (see FIG. 10). Referring to FIG. 18*b*, the user then rotates the key (or turn adaptor) in the opposite direction to rotate the cam 40 in the opposite direction (clockwise in FIG. 18*b*). As the cam 40 is rotated, the spring 7 exerts a greater force than the spring 35. As a consequence, the latch 5 moves so that the bolt 6 extends from the housing 1. While this occurs, the selector 36 maintains contact with the cam's leading edge 46 and keeps the hold-back plate 42 in its retracted position. The contact between the cam 40 and the selector 36 is maintained until the latch 5 has moved to a point where the recess 32 is no longer accessible to the plate 42. At this point, the selector 36 is able to return to the neutral position shown in FIG. 14*a* under the force provided by the spring 35 and unrestrained by the cam 40. In this state, the hold-back mode has been disengaged, but can be subsequently activated by the human user in the manner described above.

Referring to FIG. 19, the lock incorporates an indicator 30 that can be accessed to show what mode the lock is configured to at any time. It can be revealed by rotating the bolt 6 to a horizontal disposition after removing face plate 31 (as shown in FIG. 9).

While the actuators 8, 9 and the locking bars 14, 15 have each been shown as one-piece parts, in other embodiments, they may be formed from a combination of subparts. The same applies to other components of the lock where functionally practical.

In some embodiments, there may be key cylinders 3 on both sides, or on neither side. Optionally, the key cylinder or cylinders may be substituted with a keyless hand operated snib lever for moving one or the other, or both, of the locking bars 14, 15 from outside or inside the door.

FIGS. 20*a-b* illustrates the lock housing 1 prior to being fitted with the other components. The housing 1 has a central chassis 1*a* and two side panels 1*b*, 1*c*. The housing may therefore comprise all three parts, in combination. However, in alternative embodiments, the side panels may be eliminated, in which case the housing would just comprise the central chassis. The housing configuration is exemplary and may optionally take alternative forms.

Although the lock is preferred for use with doors, whether swinging or sliding, in some embodiments the lock may also be used to secure windows or other passages.

In one aspect of the disclosure, a lock is provided which includes latch means that can be moved between forward and retracted positions, a pair of actuators, a pair of locking bars, and moving means, wherein each actuator can move (i.e., turn/rotate) to cause the latch means to move between its forward and retracted positions, and wherein the moving means can, in at least one setting of the lock, cause movement of one of the locking bars independent of the other locking bar to engage a respective one of the actuators to prevent that actuator from moving the latch means between the forward and retracted positions.

In further aspects of the disclosure, the actuators may be positioned side by side, the moving means may be adapted to move the locking bars between raised and lowered positions, the moving means may include a key cylinder arranged to move just one of the locking bars, each actuator may include a hub and an outwardly extending arm arranged for movement of the latch means, the latch means may include a lock bolt able to move between bolt-extended and bolt-retracted positions, the at least one of the actuators may include a recess engaged by a respective one of the locking bars to prevent movement of the actuator, a foot of the engaging locking bar may be adapted to engage the recess, the latch mechanism may be spring biased towards its forward position, a selector may be provided which can be set so that the locking bars move in unison and can be re-set so that one locking bar can move independently of the other locking bar to engage a respective one of the actuators and with the other locking bar not engaging any of the actuators, the selector may be slid to align with one of the locking bars and can be subsequently slid to link the locking bars, the lock may be functioned by nondestructively removing a key cylinder and manipulating the selector through an opening left by removal of the cylinder, at least one of the locking bars may include a spring biased detent adapted to hold that locking bar clear of the actuators, the latch means may include a bolt arranged for engagement with a strike plate of a doorway, each actuator may include a central hub and an outwardly extending arm for engagement with the latch mechanism, each actuator may engage a handle activated snib, at least one of the actuators may include a recess or notch for receiving a foot of one of the locking bars to prevent the actuator from turning, a selector may be slid to overlap the locking bars so they move in unison, a key cylinder can be provided such that when turned by a key moves at least one of the locking bars into engagement with one of the actuators, and/or the selector can be accessed via an opening left after the cylinder is removed.

In another aspect of the disclosure, a lock is provided which includes a housing and a latch having a latch bolt and a hold-back component, wherein the hold-back component can be moved to a hold-back position where it engages a portion of the housing to maintain the latch bolt substantially within the housing.

In further aspects of the disclosure, movement of the hold-back component may engage an internal portion of the housing, the latch may incorporate a spindle having a recess and the lock formed so that the hold-back position is achieved when the spindle is turned to a position where the hold-back component is able to reversibly advance into the spindle recess under constant spring tension to engage the housing, the latch bolt may be substantially positioned within the housing with the hold-back component engaged with a recess of the housing, the hold-back component may include one or more legs that engage the housing recess when the latch-bolt is substantially positioned within the housing, the hold-back component may have two legs arranged to straddle the spindle recess when the hold-back component is received in the spindle recess, the hold-back component may comprise a plate, the latch may include a selector arranged such that the selector may be adapted to slide along the spindle, the selector may be spring biased away from the hold-back component, the selector may block the hold-back component from assuming the hold-back position until moved against the spring bias to make room for the hold-back component to advance into the spindle recess, the selector may be moved into and out of its hold-back blocking position by turning a lock cylinder so that a cam of the cylinder engages and moves the selector, the selector may be arranged so that when the latch-bolt is held substantially within the housing the hold-back component is simultaneously engaged within the spindle recess and a hold-back recess of the selector, the selector may include a protrusion that can be slid into engagement with the hold-back component to disengage the hold-back component from the spindle recess, movement of the component may engage an internal portion of the housing, the latch may incorporate a spindle having a recess, the lock may be formed so that the hold-back position is achieved when the spindle is turned to a position where the hold-back component is able to reversibly advance into the spindle recess under constant spring tension to engage the housing, the latch bolt may be substantially positioned within the housing when the hold-back component is engaged with a recess of the housing, the hold-back component may include two legs arranged to straddle the spindle recess when the hold-back component is received therein, the latch may include a selector arranged such that the selector is adapted to slide along the spindle, the selector is spring biased away from the hold-back component, the selector blocks the hold-back component from assuming the hold-back position until moved against the spring bias to make room for the hold-back component to advance into the spindle recess, the selector can be moved into and out of its hold-back blocking position by turning a lock cylinder so that a cam of the cylinder engages and moves the selector, the selector is arranged so that when the latch-bolt is held substantially within the housing the hold-back component is simultaneously engaged with the spindle recess and a hold-back recess of the selector, and the selector has a protrusion that can be slid into engagement with the hold-back component to disengage the hold-back component from the spindle recess.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock, comprising:

a housing including an aperture;

a lock cylinder configured to cover the aperture of the housing; and lock componentry positioned within the housing and being adjustable to alter a configuration of the lock, and wherein the lock componentry comprises two locking bars that are adjustable to set the configuration of the lock; and wherein the lock cylinder is removable from the housing to expose the aperture to provide access to the lock componentry in the housing; and wherein the exposed aperture is adapted to permit insertion of a tool through the aperture previously covered by the lock cylinder, and wherein the lock componentry is configured to be hand adjusted via the tool extending through the aperture.

2. The lock of claim 1, wherein the locking bars are set via the aperture of the housing to engage with a rotating actuator.

3. The lock of claim 1, wherein the lock componentry comprises a latch spindle that is adjustable to set the configuration of the lock.

4. The lock of claim 3, wherein the latch spindle is configured to be adjustably turned through a selection of different stop positions; and wherein, for at least some of the stop positions, the latch spindle causes the lock to be configured differently.

5. The lock of claim 4, wherein at least some of the stop positions are separated by a 90° turn of the latch spindle.

6. The lock of claim 4, wherein at least some of the stop positions are separated by a 120° turn of the latch spindle.

7. The lock of claim 4, wherein the latch spindle has a hold-back recess that, in at least one of the stop positions, enables a hold-back component to advance and engage with a recess in the housing so that a bolt forming part of the latch is held inside the housing.

8. The lock of claim 7, wherein the hold-back component comprises a spring loaded locking plate.

9. The lock of claim 7, wherein the hold-back component is only able to advance into the hold-back recess at one of the stop positions.

10. The lock of claim 3, wherein the latch spindle has a plurality of radial teeth that can be accessed through the aperture of the housing and pushed or pulled via hand force to rotationally adjust the latch spindle.

11. The lock of claim 1, wherein the lock comprises a mortice lock.

12. The lock of claim 1, wherein the lock cylinder, when installed, is turned with a key; or wherein the lock cylinder has a turn adaptor that can be finger-gripped and turned to cause the lock cylinder, when installed, to turn.

13. The lock of claim 1, further comprising a latch having a latch bolt and a hold-back component; and wherein the hold-back component is movable to a hold-back position to engage a portion of the housing to maintain the latch bolt substantially within the housing.

14. The lock of claim 13, wherein the latch incorporates a latch spindle having a recess; and wherein the lock is formed so that the hold-back position is achieved when the latch spindle is turned to a position where the hold-back component is able to reversibly advance into the latch spindle recess under constant spring tension to engage the housing.

15. The lock of claim 1, wherein a portion of the lock cylinder is configured to be positioned within the aperture in the housing to cover the aperture.

16. The lock of claim 1, wherein the portion of the lock cylinder is sized to fit snuggly within the aperture in the housing.

17. The lock of claim 1, wherein the portion of the lock cylinder configured to be positioned within the aperture includes a keyway configured to receive a key.

18. The lock of claim 1, wherein the lock componentry is adjustable through the aperture in the housing without having to remove the lock from a door.

19. A lock, comprising:

a housing including an aperture;

a lock cylinder configured to cover the aperture of the housing; and lock componentry positioned within the housing and being adjustable to alter a configuration of the lock;

wherein the lock cylinder is removable from the housing to expose the aperture to provide access to the lock componentry in the housing such that the lock componentry is adjusted to set the configuration of the lock;

wherein the lock componentry comprises two locking bars that are adjustable to set the configuration of the lock; and wherein the lock componentry comprises a locking bar selector that is accessible via the aperture of the housing and reversibly movable to:

overlap the locking bars wherein the locking bars can only move together; or not overlap the locking bars wherein the locking bars are able to move independently of one another.

20. The lock of claim 19, wherein the locking bar selector is arranged to be slid between an overlapping position that overlaps the locking bars and a non-overlapping position that does not overlap the locking bars.

21. A lock, comprising:

a housing including an aperture;

a lock cylinder configured to cover the aperture of the housing;

lock componentry positioned within the housing and being adjustable to alter a configuration of the lock;

latch means movable between a forward position and a retracted position;

a pair of actuators;

a pair of locking bars; and moving means for moving the locking bars;

wherein each actuator is movable to cause the latch means to move between its forward and retracted positions;

wherein the moving means can, in at least one setting of the lock, cause movement of one of the locking bars independent of the other of the locking bars to engage a respective one of the actuators to prevent that respective actuator from moving the latch means between the forward and retracted positions; and wherein the lock cylinder is removable from the housing to expose the aperture to provide access to the lock componentry in the housing such that the lock componentry may be adjusted.

22. The lock of claim 21, wherein the moving means comprises a key cylinder configured such that the key cylinder, in the at least one setting of the lock, moves just one of the locking bars.

23. The lock of claim 21, wherein at least one of the actuators comprises a recess engaged by a respective one of the locking bars to prevent movement of the at least one of the actuators.

24. A method of adjusting a configuration of a lock, comprising:

removing a lock cylinder covering an aperture in a lock housing to expose the aperture and provide access to lock componentry positioned within the lock housing, the lock componentry comprises two locking bars;

adjusting the lock componentry in the lock housing by inserting a tool through the aperture previously covered by the lock cylinder to permit alteration of a configuration of the lock, wherein the adjusting comprises adjusting the two locking bars via engagement of the tool to set the configuration of the lock;

setting the configuration of the lock by hand adjusting the lock componentry via the tool extending through the aperture; and reinserting the lock cylinder in the lock housing.

25. The method of claim 24, wherein the lock componentry comprises a locking bar selector that is accessible via the aperture of the housing; and wherein the method further comprises reversibly moving the locking bar selector to:

overlap the locking bars wherein the locking bars can only move together; or not overlap the locking bars wherein the locking bars are able to move independently of one another.

26. A method of adjusting a configuration of a lock, comprising:

removing a lock cylinder covering an aperture in a lock housing to expose the aperture and provide access to lock componentry positioned within the lock housing;

adjusting the lock componentry in the lock housing via access provided by the aperture to permit alteration of a configuration of the lock;

setting the configuration of the lock via the adjusting of the lock componentry; and reinserting the lock cylinder in the lock housing;

wherein the lock componentry comprises two locking bars;

wherein the adjusting comprises adjusting the two locking bars to set the configuration of the lock; and wherein the two locking bars are set via the aperture in the lock housing to engage with a respective rotating actuator, and wherein the respective rotating actuator is turned as a result of a turn of a door handle engaged with the lock.

* * * * *